(12) United States Patent
Lavie et al.

(10) Patent No.: US 12,013,916 B2
(45) Date of Patent: Jun. 18, 2024

(54) SYSTEM AND METHOD FOR USE OF PATTERN RECOGNITION IN ASSESSING OR MONITORING VEHICLE STATUS OR OPERATOR DRIVING BEHAVIOR

(71) Applicant: Scope Technologies Holdings Limited, Tortola (VG)

(72) Inventors: Samuel Lavie, Johannesburg (ZA); Friedl Jacobs, Johannesburg (ZA); Gil Fuchs, Nes Tziona (IL); Johann Van Den Bergh, Johannesburg (ZA)

(73) Assignee: Scope Technologies Holdings Limited, Tortola (VG)

( * ) Notice: Subject to any disclaimer, the term of this patent is extended or adjusted under 35 U.S.C. 154(b) by 0 days.

(21) Appl. No.: 18/111,972

(22) Filed: Feb. 21, 2023

(65) Prior Publication Data

US 2023/0281264 A1 Sep. 7, 2023

Related U.S. Application Data

(63) Continuation of application No. 17/179,108, filed on Feb. 18, 2021, now abandoned, which is a continuation of application No. 16/724,931, filed on Dec. 23, 2019, now Pat. No. 10,929,500, which is a continuation of application No. 15/809,425, filed on Nov. 10, 2017, now Pat. No. 10,546,042, which is a continuation of application No. 13/679,722, filed on Nov. 16, 2012, now Pat. No. 9,824,064.

(Continued)

(51) Int. Cl.
*G07C 5/08* (2006.01)
*G06F 17/00* (2019.01)
*G07C 5/00* (2006.01)

(52) U.S. Cl.
CPC ............ *G06F 17/00* (2013.01); *G07C 5/008* (2013.01); *G07C 5/0808* (2013.01)

(58) Field of Classification Search
CPC ........ G06F 17/00; G07C 5/008; G07C 5/0808
See application file for complete search history.

(56) References Cited

U.S. PATENT DOCUMENTS 6,204,758 B1 * 3/2001 Wacker ............... B60C 23/0416
340/447
2007/0271014 A1 * 11/2007 Breed ................. B60R 21/0152
701/31.9

(Continued)

*Primary Examiner* — Rodney A Butler
(74) *Attorney, Agent, or Firm* — Downs Rachlin Martin PLLC

(57) ABSTRACT

A system and method which uses pattern recognition in assessing or monitoring a vehicle status and/or an operator's driving behavior. A vehicle, for use by an operator or driver, can be equipped with a data collection and assessment system. The system can comprise one or more data collection devices, e.g., accelerometers, which can be used to capture data and information, or otherwise measure vehicle actions. A pattern recognition module is configured with one or more defined operating patterns, each of which operating patterns reflects either a known change in vehicle status corresponding to, e.g., when a passenger has embarked or disembarked the vehicle, or a known vehicle operating or driving behavior. Information collected as events describing a current vehicle status or a current driving behavior can be compared with the known operating patterns.

15 Claims, 7 Drawing Sheets

Related U.S. Application Data

(60) Provisional application No. 61/578,511, filed on Dec. 21, 2011.

(56) References Cited

U.S. PATENT DOCUMENTS

| | | | |
|---|---|---|---|
| 2010/0043552 A1* | 2/2010 | Stenbock Andersen | G01P 15/18 |
| | | | 73/514.29 |
| 2010/0204877 A1* | 8/2010 | Schwartz | G06F 17/00 |
| | | | 701/31.4 |
| 2010/0304754 A1* | 12/2010 | Czompo | H04W 52/0254 |
| | | | 455/574 |
| 2013/0191002 A1* | 7/2013 | Minase | G06F 17/00 |
| | | | 701/70 |

* cited by examiner

SYSTEM AND METHOD FOR USE OF PATTERN RECOGNITION IN ASSESSING OR MONITORING VEHICLE STATUS OR OPERATOR DRIVING BEHAVIOR

RELATED APPLICATION DATA

This application is a continuation of U.S. Nonprovisional patent application Ser. No. 17/179,108, filed on Feb. 18, 2021; which application is a continuation of U.S. Nonprovisional patent application Ser. No. 16/724,931, filed on Dec. 23, 2019, and entitled "System and Method for Use of Pattern Recognition in Assessing or Monitoring Vehicle Status or Operator Driving Behavior" (now U.S. patent Ser. No. 10/929,500), which application is a continuation of U.S. Nonprovisional patent application Ser. No. 15/809,425, filed Nov. 10, 2017, and entitled "System and Method for Use of Pattern Recognition in Assessing or Monitoring Vehicle Status or Operator Driving Behavior" (now U.S. Pat. No. 10,546,042); which application is a continuation of U.S. Nonprovisional patent application Ser. No. 13/679,722, filed Nov. 16, 2012, entitled "System and Method for Use of Pattern Recognition in Assessing or Monitoring Vehicle Status or Operator Driving Behavior" (now U.S. Pat. No. 9,824,064); which application claims the benefit of priority of U.S. Provisional Patent Application Ser. No. 61/578,511, filed Dec. 21, 2011, and titled "System and Method for Use of Pattern Recognition in Assessing or Monitoring Vehicle Status or Operator Driving Behavior". Each of these applications is incorporated by reference herein in its entirety.

FIELD OF THE INVENTION

Embodiments of the invention are generally related to telematics and related technologies as may be used in vehicle monitoring and other applications, and are particularly related to a system and method for use of pattern recognition in assessing or monitoring a current status of a vehicle, such as determining when an operator or a passenger has embarked or disembarked the vehicle, and/or an operator's driving behavior.

BACKGROUND

Telematics generally refers to the integration of telecommunications and informatics, and is often described in the context of sending and receiving information about moving objects by means of telecommunication devices. A well-known use of telematics is in regard to vehicles, and with control of moving vehicles, such as haulage trucks. devices such as Global Positioning Systems (GPS) can be used to provide additional information beyond that provided by the vehicle itself. Telematics are of particular use in industries such as fleet management, which might also include tracking the location and operation of ships, trains, and planes.

Information about vehicle usage also has a bearing on factors such as insurance. Heavily-used vehicles are on the road more often, and this type of information is useful for the insurance industry. However telematics information such as that provided by GPS is largely macro in nature, and does not necessarily reflect the micro-conditions of day-to-day driving. As such, conventional telematics information is generally less pertinent for monitoring casual vehicle users, and is typically not intended for providing information of particular interest to insurers, such as the number of passengers in a vehicle at the time of an accident. These are the general areas that embodiments of the invention are intended to address.

SUMMARY OF THE DISCLOSURE

Disclosed herein is a system and method which uses pattern recognition in assessing or monitoring a vehicle status and/or an operator's driving behavior. A vehicle, for use by an operator or driver, can be equipped with a data collection and assessment system. The system can comprise one or more data collection devices, e.g., accelerometers, which can be used to capture data and information, or otherwise measure vehicle actions. A data communication module enables communication of the collected data and information, such as through the use of telematics, to one or more other systems, which can be local or onboard to the vehicle, or a remote system. A pattern recognition module is configured with one or more defined operating patterns, each of which operating patterns reflects either a known change in vehicle status corresponding to, e.g., when a passenger has embarked or disembarked the vehicle, or a known vehicle operating or driving behavior. Information collected as events describing a current vehicle status or a current driving behavior can be compared with the known operating patterns. In accordance with an embodiment, the information can then be used locally or communicated to an operator assessment and monitoring system or service, which can provide additional functionality, such as ensuring a driver's compliance with employment or other mandated driving requirements, or assessing a driver's suitability for insurance reasons, including, e.g., taking into account a driver's reaction to variations in the road, cornering, and other driving situations.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Disclosed herein is a system and method which uses pattern recognition in assessing or monitoring events describing a current vehicle status, such as determining when an operator or a passenger has embarked or disembarked the vehicle, and/or events describing an operator's current driving behavior. The information can be used locally or communicated to an operator assessment and monitoring system or service, which can provide additional functionality, such as ensuring a driver's compliance with employment or other mandated driving requirements, or assessing a driver's suitability for insurance reasons, including, e.g., taking into account a driver's reaction to variations in the road, cornering, and other driving situations.

Although many of the illustrations provided herein describe embodiments using vehicles and accelerometers, it will be evident that the systems and techniques described herein can be used with operator-controlled devices other than vehicles, such as trains and ships, and with other types of data-collection devices.

Figure 1:
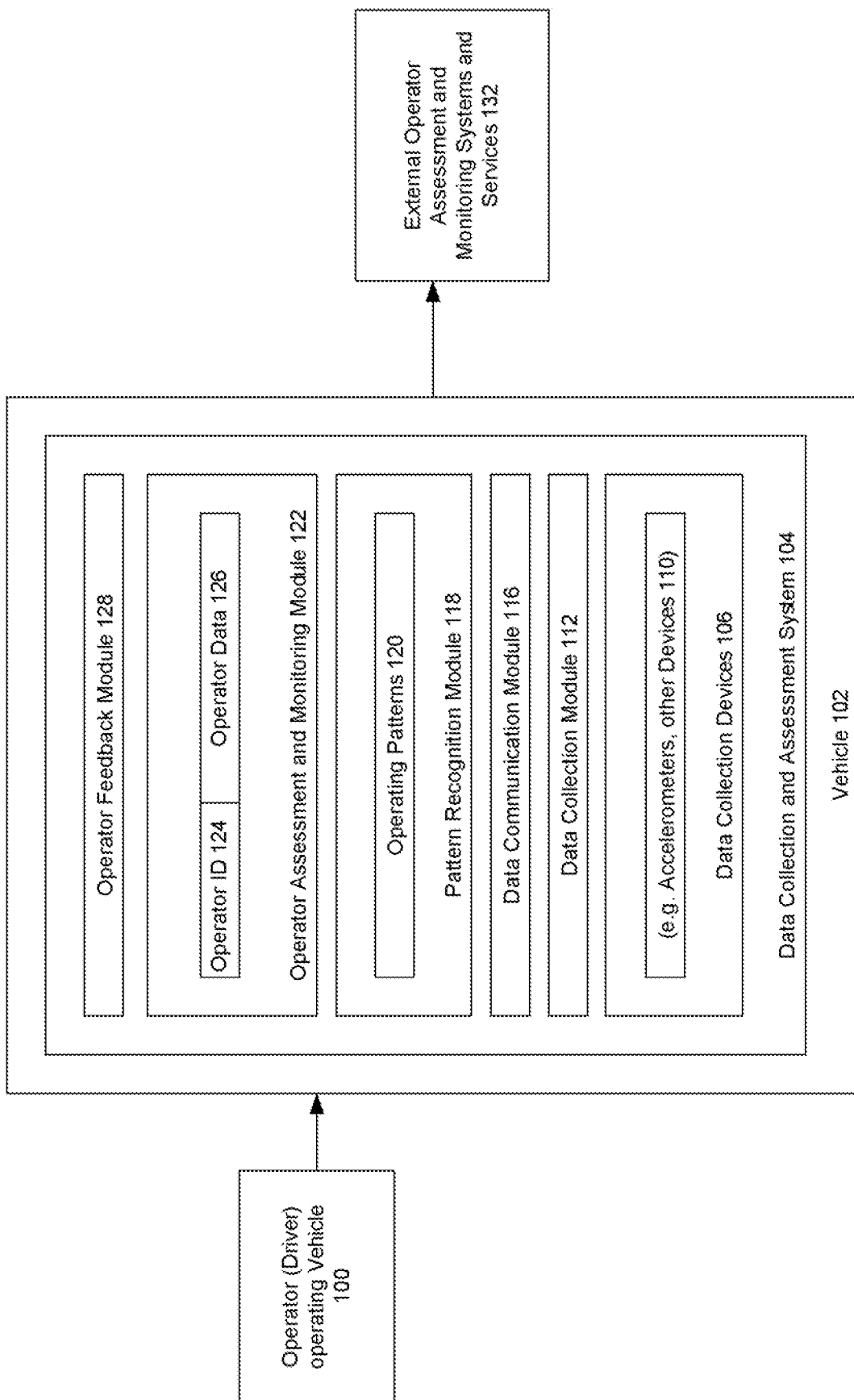
FIG. 1 shows an illustration of a system which uses pattern recognition in assessing or monitoring a vehicle status or an operator's driving behavior, in accordance with an embodiment.

FIG. 1 shows an illustration of a system which uses pattern recognition in assessing or monitoring a vehicle status or an operator's driving behavior, in accordance with an embodiment. As shown in FIG. 1, in accordance with an embodiment, a vehicle 102, for use by an operator or driver 100, can be equipped with a data collection and assessment system 104. The system can comprise one or more data collection devices 106 (e.g., accelerometers or other measurement devices 110) that can be used to capture data and information, or otherwise measure vehicle actions. A data collection module 112 collects the data or information from the data collection devices, while a data communication module 112 enables communication of the collected data and information, such as through the use of telematics, to one or more other systems.

A pattern recognition module 118 is configured with one or more defined operating patterns 120, each of which operating patterns reflects either a known change in vehicle status corresponding to, e.g. when a passenger has embarked or disembarked the vehicle, or a known vehicle operating or driving behavior. For example, when an operator embarks a vehicle on the driver's side, the vehicle responds in a physically-measurable manner (e.g., by moving downwards momentarily or tilting to one side). When a passenger then embarks the same vehicle, perhaps from an opposite side or through the rear doors, the vehicle responds in a physically-measurable manner, albeit with a different pattern. Each discernible pattern or set of events reflects a known change in the vehicle status. A sequence of patterns can reflect, as in the above example, that the vehicle, or its vehicle status, now likely includes both the operator and the passenger. Similar physically-measurable patterns can reflect when the operator or passenger leaves or disembarks a vehicle.

A vehicle also responds in a physically-measurable manner to operator-based driving actions, e.g. by the operator turning the vehicle sharply at a corner. This enables the system to associate other events and patterns with an operator's driving behavior.

Sequences of patterns can be used to reflect changes both in the vehicle status and in the operator's driving behavior over a period of time, say from the time an operator embarks the vehicle, through a series of driving maneuvers, up until the time of a later accident.

In accordance with an embodiment, an operator assessment and monitoring module 122 includes information about one or more vehicle operators, including for each operator an identifier (ID) 124 and additional data or information 126 describing that operator and/or their typical operating characteristics. An operator feedback module 128 can be used to provide immediate or local feedback to the operator depending on their current vehicle status and/or operator driving behavior.

Any resultant information, pattern matching, or driver feedback can also be remotely communicated to an external operator assessment and monitoring system or service 132, which can provide additional functionality, such as ensuring a driver's compliance with employment or other mandated driving requirements, or assessing a driver's suitability for insurance reasons.

Figure 2:
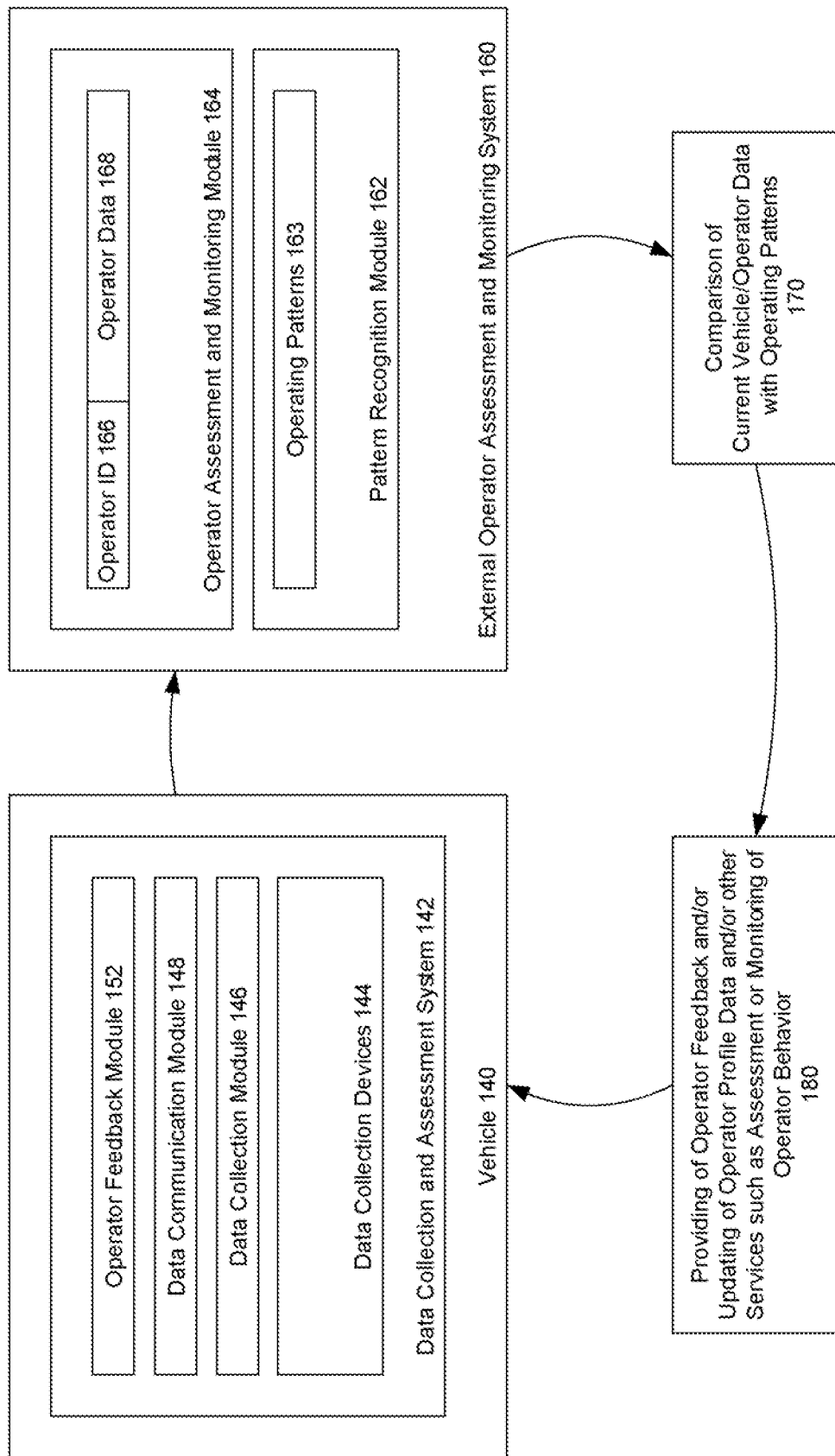
FIG. 2 shows another illustration of a system which uses pattern recognition in assessing or monitoring a vehicle status or an operator's driving behavior, in accordance with an embodiment.

FIG. 2 shows another illustration of a system which uses pattern recognition in assessing or monitoring a vehicle status or an operator's driving behavior, in accordance with an embodiment. As shown in FIG. 2, depending on the particular implementation, a selection of the components of the system can be provided onboard or locally to the vehicle, while others of the components can be provided elsewhere separately or remotely from the vehicle, or by a third-party. For example, in accordance with an embodiment, the vehicle 140 can include a collection and assessment system 142 that comprises one or more data collection devices 144, a data collection module 146, a data communication module 148, and an operator feedback module 152. An external operator assessment and monitoring system or service 160, which in this example is provided separately from the vehicle, can include a pattern recognition module 162 configured with one or more defined operating patterns 163, and an operator assessment and monitoring module 164 that includes information about one or more vehicle operators, including for each operator an operator ID 166 and additional data or information 166.

Different arrangements of modules/components can be provided in accordance with different embodiments to suit particular implementations. In some embodiments, the pattern recognition module can be provided onboard or locally to the vehicle, to provide immediate or local feedback to the operator depending on a current status of their vehicle and/or their current driving behavior, without a need for an external system or service. For example, a system including local feedback might determine that too many passengers have embarked the vehicle for preferred safe driving, and communicate this information to the operator prior to them starting the vehicle.

As further shown in FIG. 2, the information collected describing a current vehicle/operator status or driving pattern can be compared 170 with known operating patterns, and the results of the comparison used in providing operator feedback and/or updating operator profile data and/or providing other services such as assessment or monitoring of operator behavior 180.

Figure 3:
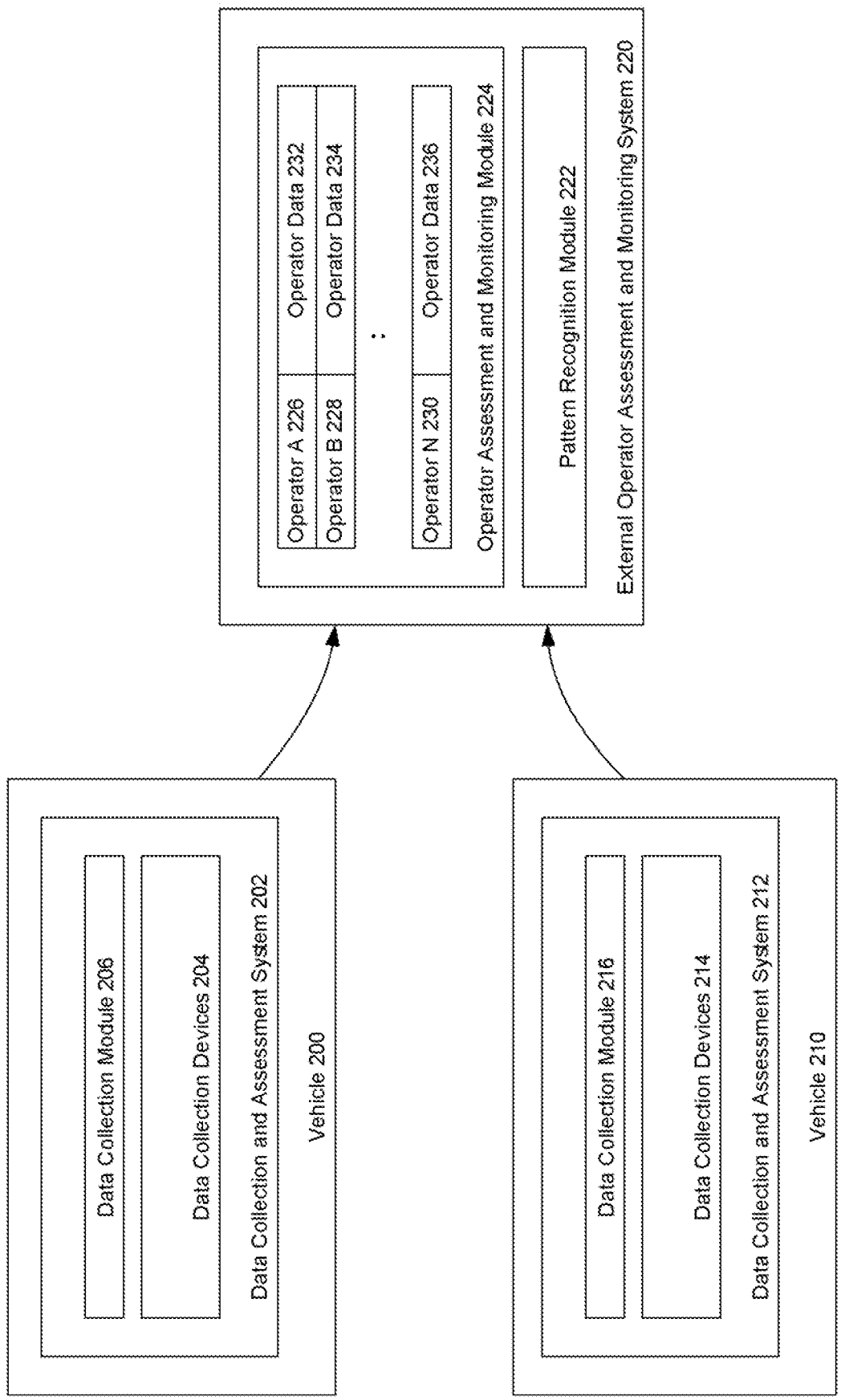
FIG. 3 shows another illustration of a system which uses pattern recognition in assessing or monitoring a vehicle status or an operator's driving behavior, in accordance with an embodiment.

FIG. 3 shows another illustration of a system which uses pattern recognition in assessing or monitoring a vehicle status or an operator's driving behavior, in accordance with an embodiment. As shown in FIG. 3, depending on the particular implementation, the system can be used to assess and monitor a plurality of vehicles or their operators. In accordance with an embodiment, each vehicle 200, 210 comprises a data collection and assessment system 202, 212 that comprises one or more data collection devices 204, 214 (e.g., accelerometers), and a data collection module 206, 216. An external operator assessment and monitoring system or service 220 that includes a pattern recognition module 222 further comprises an operator assessment and monitoring module 224 that includes information about a plurality of vehicle operators, including for each operator an identifier (ID) 226, 228, 230 and additional data or information 232, 234, 236 describing that operator or their operating characteristics.

Figure 4:
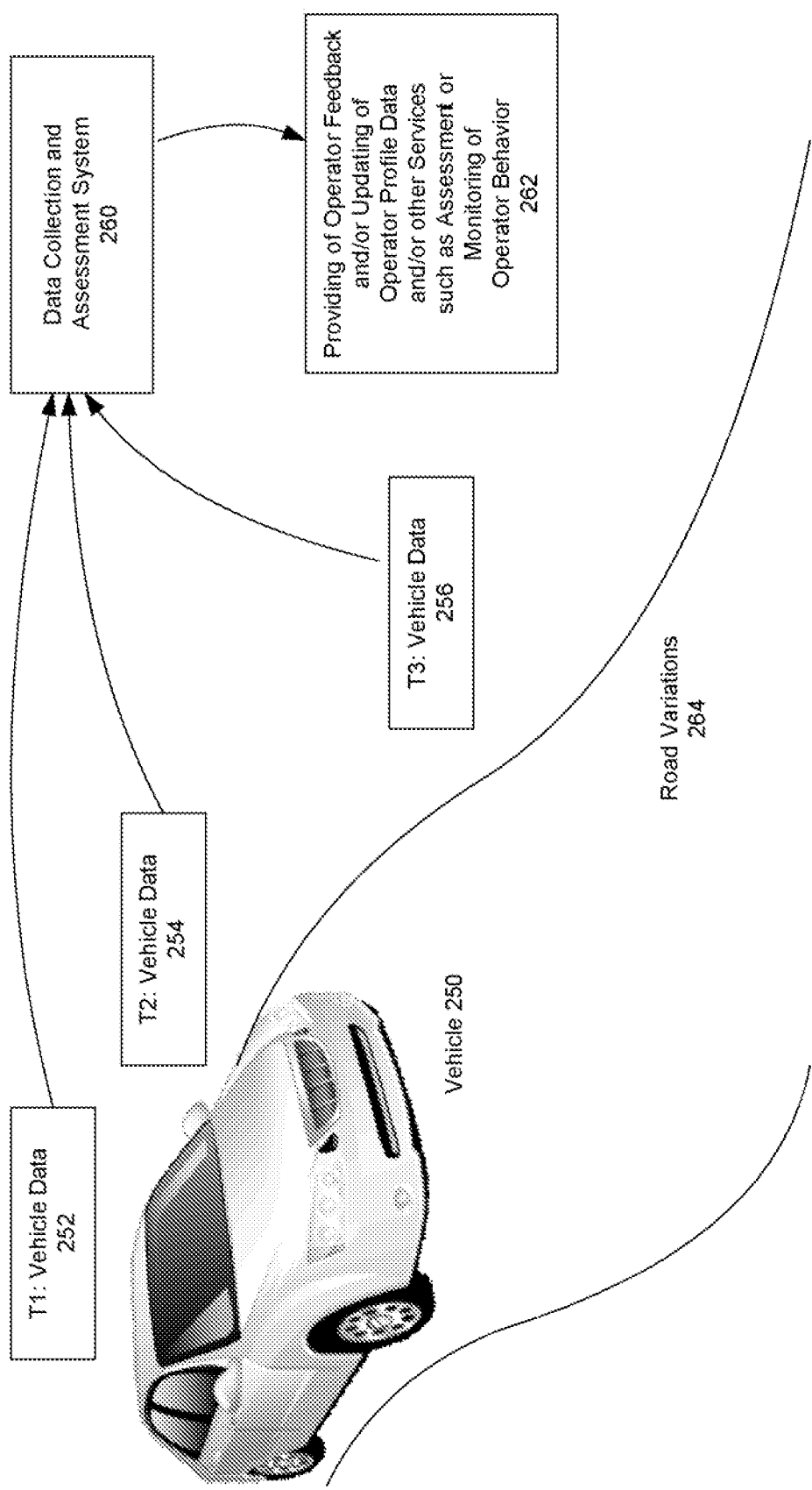
FIG. 4 shows an illustration of a system which uses pattern recognition in assessing or monitoring a vehicle status or an operator's driving behavior, as it may be used with a vehicle and driver, in accordance with another embodiment.

FIG. 4 shows an illustration of a system which uses pattern recognition in assessing or monitoring a vehicle status or an operator's driving behavior, as it may be used with a vehicle and driver, in accordance with another embodiment. As shown in FIG. 4, while a vehicle 250 is used, and as events happen or as time passes T1 (252), T2 (254), T3 (256), current vehicle/operator data is communicated to a data collection and assessment system 260 (which as described above can be provided onboard to the vehicle or remotely via telematics). The information can then be used by or communicated to an operator assessment and monitoring system or service 262, which can provide additional functionality, such as ensuring a driver's compliance with employment or other mandated driving requirements, or assessing a driver's suitability for insurance reasons, including, e.g., taking into account a driver's reaction to variations in the road 264, cornering, and other driving situations.

Figure 5:
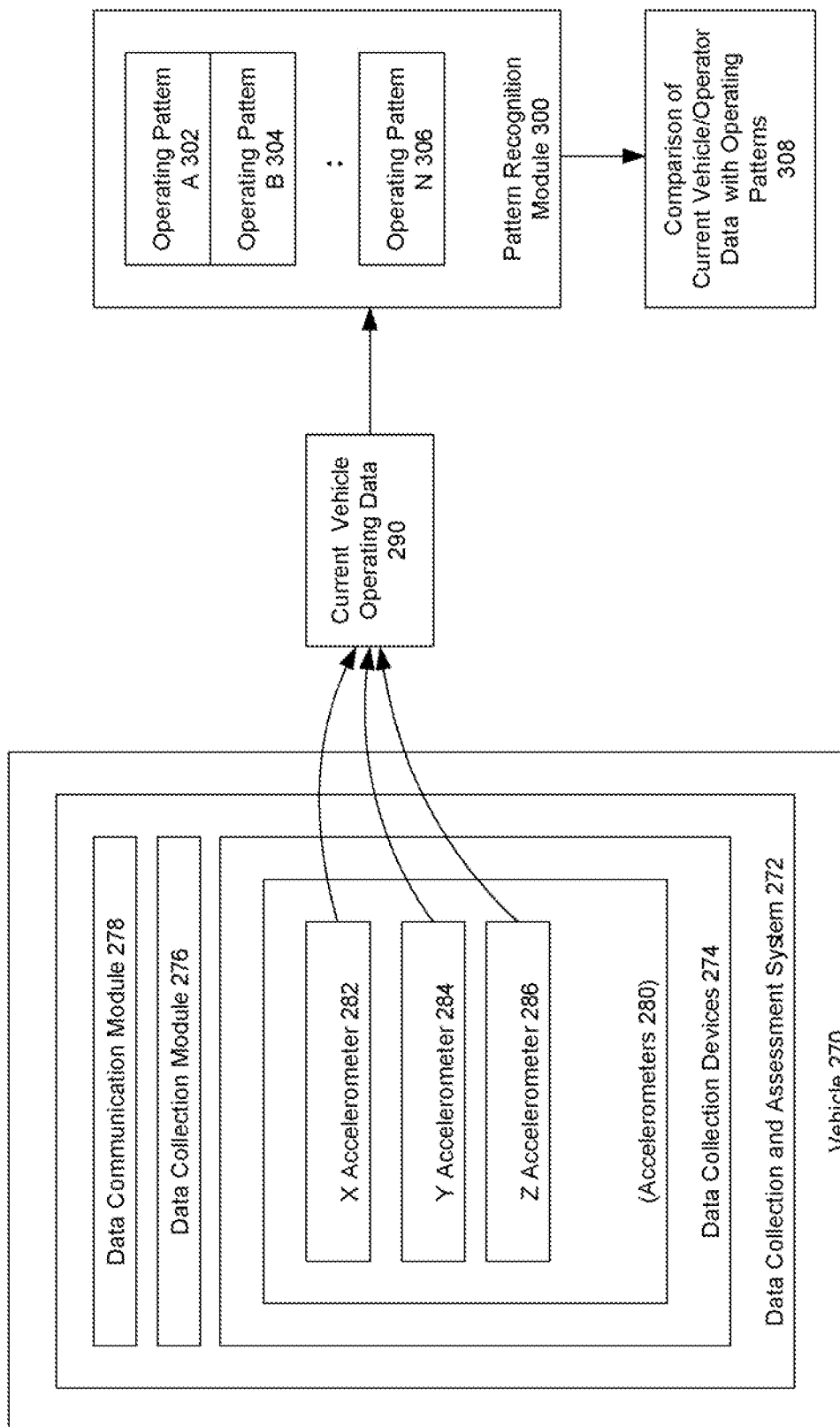
FIG. 5 shows another illustration of a system which uses pattern recognition in assessing or monitoring a vehicle status or an operator's driving behavior, in accordance with an embodiment.

FIG. 5 shows another illustration of a system which uses pattern recognition in assessing or monitoring a vehicle status or an operator's driving behavior, in accordance with an embodiment. As shown in FIG. 5, in accordance with an embodiment the vehicle 270 can be equipped with a data collection and assessment system 272, including a data collection module 276, data communication module 278, and accelerometers 280 as data collection devices 274, or similar devices used to measure changes in acceleration or direction of a vehicle. Information can be collected from a plurality of (in the illustrated example) X 282, Y 284, and Z 286 axis-measuring accelerometers, and collectively used to provide a current vehicle/operator data 290. The pattern recognition module 300 can be configured with one or more defined operating patterns 302, 304, 306, each of which reflects a known vehicle/operator status or driving pattern based on accelerometer data. The information provided regarding current vehicle/operator accelerometer-based-data can be compared with the known accelerometer-based operating patterns, and the results of the comparison used providing of operator feedback and/or updating of operator profile data and/or other services such as assessment or monitoring of operator behavior.

Figure 6:
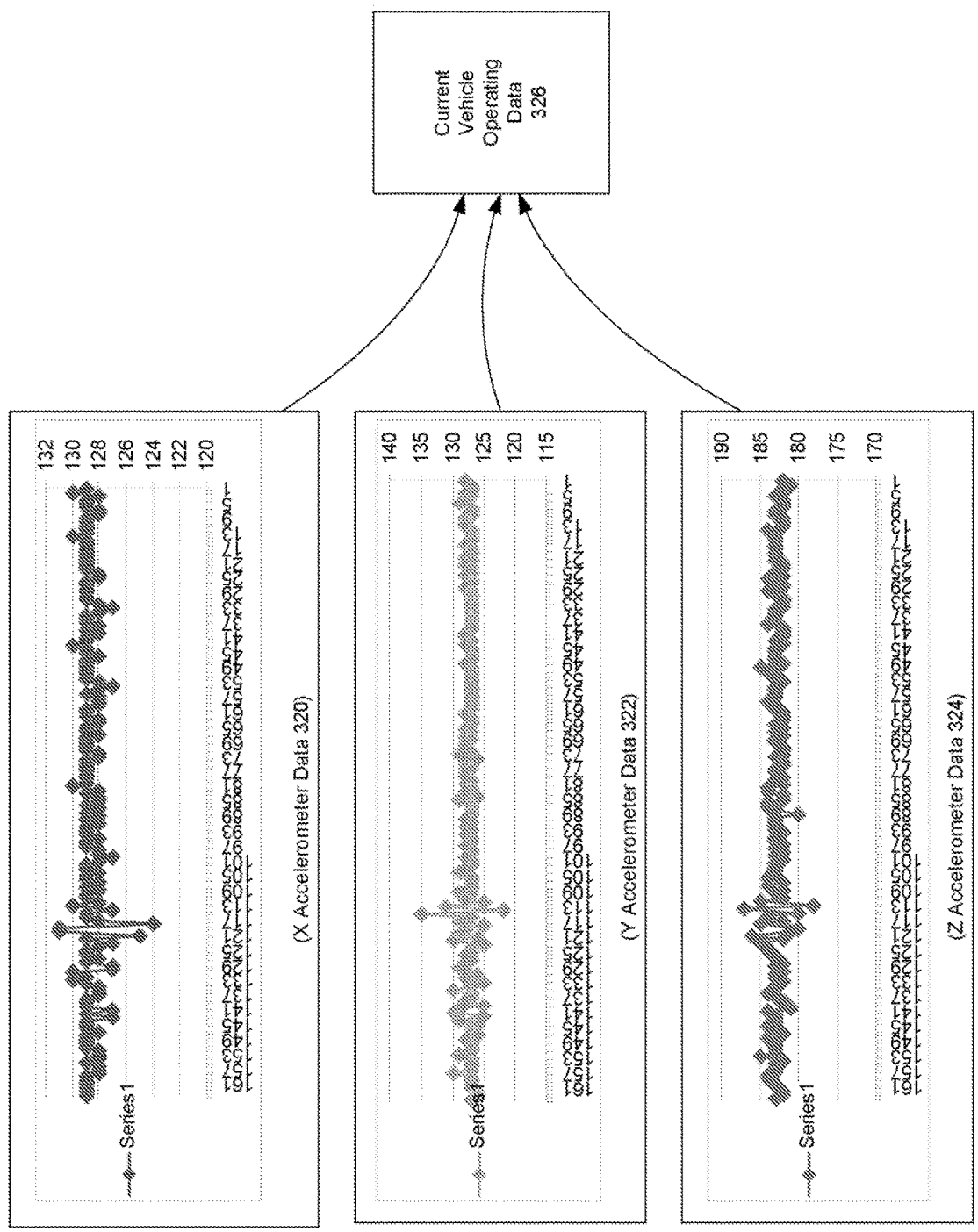
FIG. 6 shows an illustration of examples of data to be used with pattern recognition in assessing or monitoring a vehicle status or an operator's driving behavior, in accordance with an embodiment.

FIG. 6 shows an illustration of examples of data to be used with pattern recognition in assessing or monitoring a vehicle status or an operator's driving behavior, in accordance with an embodiment. As shown in FIG. 6, in accordance with an embodiment wherein the data collection and assessment system utilize accelerometers, or similar devices used to measure changes in acceleration or direction of a vehicle, information can be collected from a plurality of X, Y, and Z axis-measuring accelerometers (320, 322, 324), and collectively used to provide a current vehicle/operating data 326. For example, as described above, when an operator or passenger embarks or disembarks a vehicle on the driver's side, the vehicle responds in a physically-measurable manner. In accordance with an embodiment, the accelerometers can detect the minor accelerations in the vehicle when a person enters the car and closes the door, takes a corner or brakes sharply, or drives in a manner considered unsafe. The information collected describing a current vehicle/operator status or driving pattern can be compared with known operating patterns, and the results of the comparison used in providing operator feedback and/or updating operator profile data and/or providing other services such as assessment or monitoring of operator behavior 328.

As further shown in FIG. 6, each of the graphs 320, 322, 342 can show accelerations in the X, Y, and Z axes respectively for a stationary vehicle. Each time a passenger enter/exits the vehicle and the engine is on, the system registers a low amplitude up and down motion hovering around value 128+−2 units for a non-event average, followed by a minor perturbation simultaneously in all three axes where the amplitude jumps above the "normal" amplitude. The system can recognize these up and down characteristics as a known pattern.

In accordance with an embodiment, further discernment can include, e.g. recognizing minor variations in the pattern to determine the vehicle being pushed to the left, representative of an entry on the right side; or the vehicle being pushed forward and to the right, representative of an entry to the left-rear side. Information such as this can be used to ensure a driver's compliance with employment or other mandated driving requirements, or assessing a driver's suitability for insurance reasons, including, e.g. preventing insurance fraud, detecting patterns and then using occurrences of said patterns when they occur, to say with some level of confidence (a confidence coefficient) that an event of certain type occurred, which is particularly useful for post-accident investigations.

Figure 7:
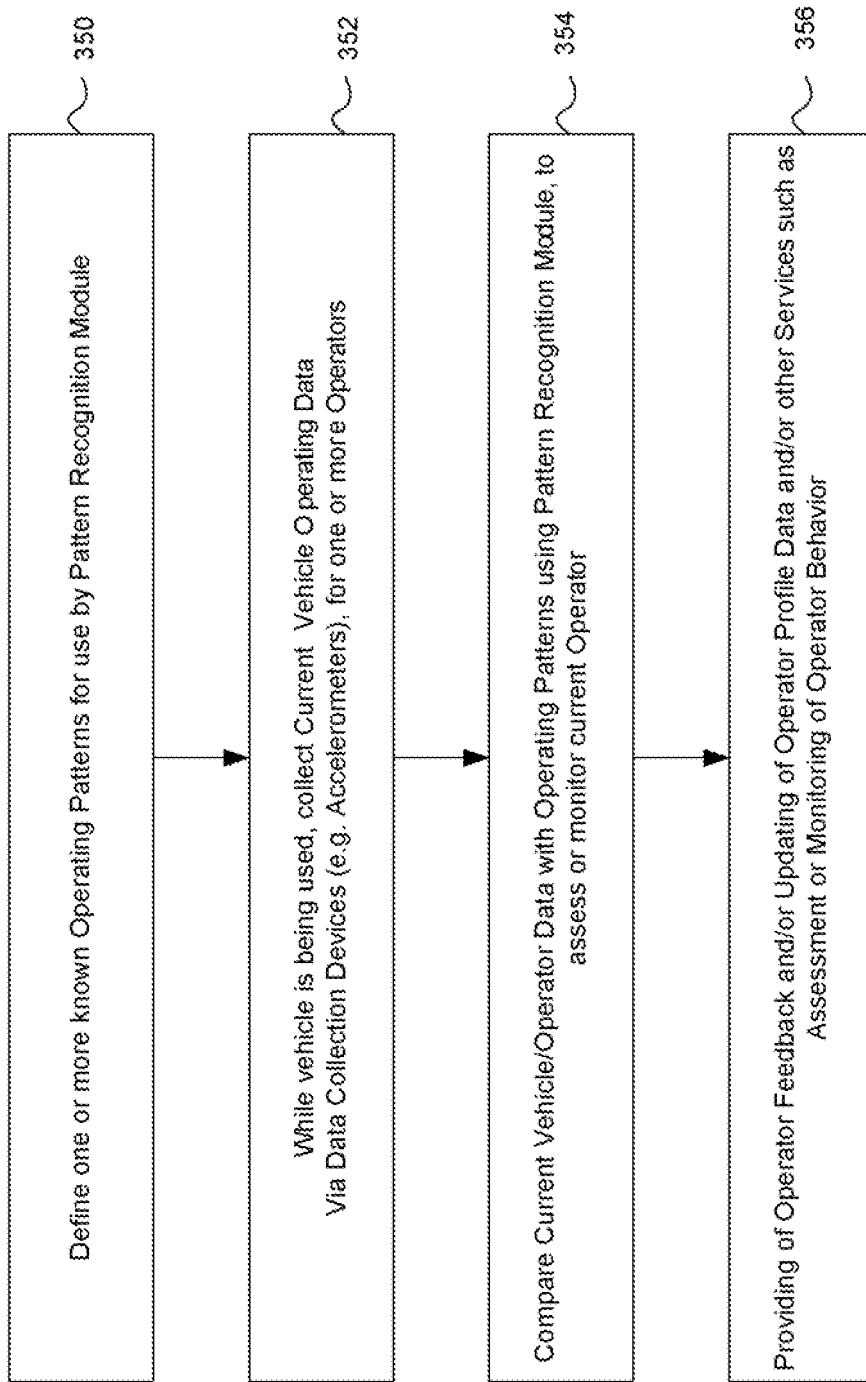
FIG. 7 shows a flowchart of a method of using pattern recognition in assessing or monitoring a vehicle status or an operator's driving behavior, in accordance with an embodiment.

FIG. 7 shows a flowchart of a method of using pattern recognition in assessing or monitoring a vehicle status or an operator's driving behavior, in accordance with an embodiment. As shown in FIG. 7, at step 350, one or more known operating patterns are defined for use by the pattern recognition module. At step 352, while the vehicle is being used, current vehicle operating data is collected via data collection devices (e.g. accelerometers), for one or more operators. At step 254, the current vehicle/operator data is compared with operating patterns using pattern recognition module, to assess or monitor current operator. At step 356, the system provides operator feedback and/or updates of operator profile data and/or provides other services such as assessment or monitoring of operator behavior.

In accordance with various embodiments, the above-described systems and methods can be employed in a variety of use cases. For example, the system can be used in conjunction with an automatic rescue or emergency dispatch system, wherein information about the number of passengers in a vehicle can be automatically communicated to a central rescue or emergency service. As another example, the system can be used in conjunction with systems for parental or otherwise tracking the habits of younger drivers, e.g. to ensure that the number of passengers within a vehicle is kept within certain predefined limits, or for vehicle insurance purposes.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CO-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. For example, although many of the illustrations provided herein describe embodiments using vehicles and accelerometers, it will be evident that the systems and techniques described herein can be used with operator-controlled devices other than vehicles, such as trains and ships, and with other types of data collection devices. It is intended that the scope of the invention be defined by the following claims and their equivalence.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computer-implemented, in-vehicle system for determining status of a stationary vehicle, comprising:
    a three perpendicular component accelerometer located in the vehicle and configured to generate vehicle acceleration data representing changes in acceleration acting on the stationary vehicle;
    a memory containing predefined acceleration patterns representing motion of the vehicle responsive to accelerations acting on the vehicle, including accelerations acting on the vehicle while stationary;
    and a microprocessor programmed to receive said vehicle acceleration data from the accelerometer and to compare, using pattern recognition, the predefined acceleration patterns to the vehicle acceleration data and, upon finding one or more pattern matches, to make a determination of stationary vehicle status corresponding to the matched acceleration pattern, and
    a telecommunications device in communication with the microprocessor wherein, in the event of an emergency, a number of vehicle entry and exit is automatically communicated to a rescue or emergency service; and
    wherein said predefined vehicle acceleration patterns stored in memory for accelerations acting on the stationary vehicle comprise patterns representing motion of the vehicle responsive to vehicle entry and exit events.

2. The system of claim 1, wherein said predefined vehicle acceleration patterns representing motion of the vehicle responsive to vehicle occupant entry and exit events are acceleration patterns correlated to opening and closing of vehicle doors.

3. The system of claim 1, wherein said predefined vehicle acceleration patterns stored in memory for accelerations acting on the stationary vehicle comprise acceleration patterns correlated to vehicle accidents.

4. The system of claim 1, wherein:
    said system is further configured to determine vehicle operator driving actions; and
    said predefined vehicle acceleration patterns stored in memory further include patterns representing operator-based driving actions with respect to a moving vehicle, and said microprocessor is further programmed, using said pattern recognition and, upon finding one or more pattern matches to patterns representing operator-based driving actions, to make a determination of operator driving actions.

5. The system of claim 4, wherein the predefined acceleration patterns are specific to one or more of an individual operator and a type of vehicle.

6. The system of claim 1, wherein at least one of said memory and microprocessor are located within the vehicle.

7. The system of claim 1, wherein said memory and microprocessor are located remotely from the vehicle and communicate remotely with the vehicle to receive said vehicle acceleration data.

8. A method of using pattern recognition in a computer-implemented, in-vehicle system for determining status of a stationary vehicle, comprising:
    measuring vehicle acceleration responsive to externally applied force acting on the vehicle, including acceleration responsive to externally applied force acting on the stationary vehicle, along three perpendicular axes using an accelerometer located in the vehicle;
    storing, in a computer memory, predefined vehicle acceleration patterns representing motion of the vehicle responsive to accelerations acting on the vehicle, including accelerations acting on the vehicle while stationary;

using a microprocessor programmed with pattern recognition instructions, comparing the predefined acceleration patterns, with the measured vehicle accelerations and determining a number of vehicle entry and exit events at any given time; and automatically communicating the number of vehicle entry and exit events to a rescue or emergency service in the event of an emergency using a telecommunications device in communication with the microprocessor; and wherein said predefined patterns stored in memory for accelerations acting on the stationary vehicle comprise patterns representing motion of the vehicle responsive to vehicle occupant entry and exit events.

9. The method of claim 8, wherein said predefined vehicle acceleration patterns representing motion of the vehicle responsive to vehicle occupant entry and exit events further comprise acceleration patterns correlated to opening and closing of vehicle doors.

10. The method of claim 8, wherein said predefined patterns stored in memory for accelerations acting on the stationary vehicle comprise acceleration patterns correlated to vehicle accidents.

11. The method of claim 8, wherein:
said method further determines vehicle operator driving actions; and
said predefined vehicle acceleration patterns comprise patterns representing operator-based driving actions with respect to a moving vehicle, and said comparing further comprises determining an operator driving behavior based on one or more pattern matches of said measured vehicle accelerations to said predefined vehicle acceleration patterns representing operator-based driving actions.

12. The method of claim 11, wherein the vehicle acceleration patterns are specific to one or more of an individual operator and a type of vehicle.

13. The method of claim 8, further comprising communicating the measured vehicle acceleration to said microprocessor.

14. The method of claim 13, wherein said memory and microprocessor are located remotely from the vehicle and communicate remotely with the vehicle to receive said measured vehicle acceleration.

15. The method of claim 13, wherein at least one of said memory and microprocessor is located on board the vehicle.

* * * * *